W. H. TRAYLOR.
Harrow and Seed-Sower.
No. 222,753. Patented Dec. 16, 1879.
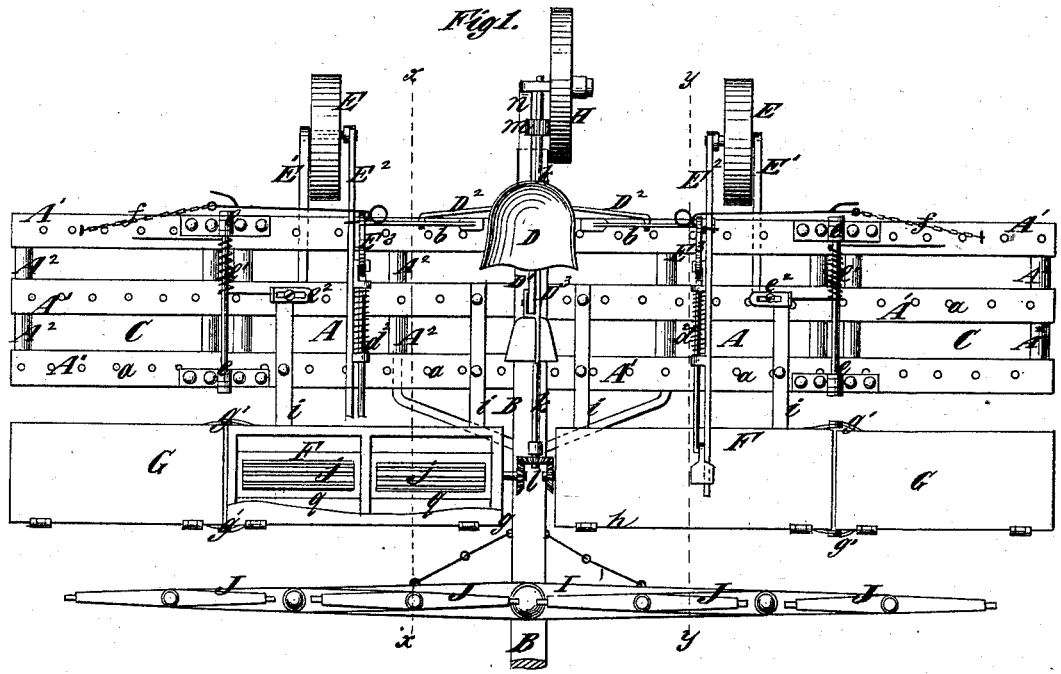
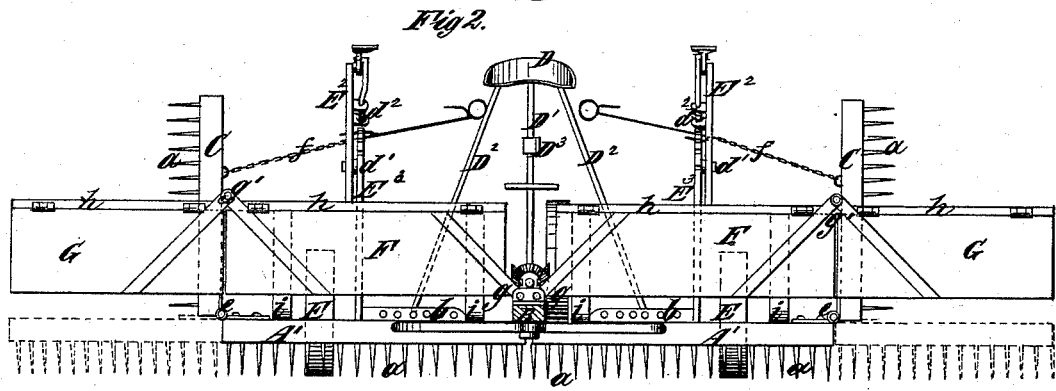
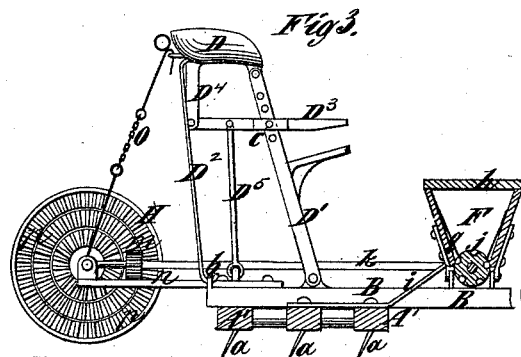
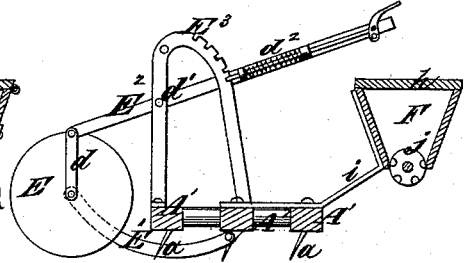
Witnesses:
Fred. Haynes
E. P. Jessup
Inventor
William H. Traylor
by his Attorneys
Brown & Brown

UNITED STATES PATENT OFFICE.

WILLIAM H. TRAYLOR, OF STANFORD, KENTUCKY.

IMPROVEMENT IN HARROWS AND SEED-SOWERS.

Specification forming part of Letters Patent No. 222,753, dated December 16, 1879; application filed September 3, 1879.

*To all whom it may concern:*

Be it known that I, WILLIAM H. TRAYLOR, of Stanford, in the county of Lincoln and State of Kentucky, have invented certain new and useful Improvements in Harrows and Seed-Sowers, of which the following is a specification.

My invention consists in the combination, with a harrow composed of two sections hinged longitudinally to the pole at the center of the harrow, of seed-boxes supported by said sections of the harrow, and likewise hinged longitudinally, whereby the harrow and seed-boxes adjust themselves to the surface of ground over which the harrow is drawn.

It also consists in various details of construction and combinations of parts hereinafter described.

In the accompanying drawings, Figure 1 represents a plan of a harrow embodying my improvements. Fig. 2 is a front elevation of said harrow. Fig. 3 is a section thereof on the dotted line $x\ x$, Fig. 1; and Fig. 4, a similar section on the dotted line $y\ y$, Fig. 1.

Similar letters of reference designate corresponding parts in all the figures.

As here represented, the harrow is composed of two sections, A A, hinged longitudinally at the center to the pole B, and having hinged at their outer ends two other sections, C C.

The frame-work of the harrow consists of three or more fixed pieces or timbers, A', extending parallel transversely to the pole B, and connected by cross-braces $A^2$, through which may pass bolts for securing the several parts of the frame-work rigidly together. From this frame-work the teeth $a$ of the harrow extend.

D designates the driver's seat, mounted over the pole, and supported upon a leg, D', hinged to the pole B, and two side legs, $D^2$, inserted at the lower ends in plates $b$. In these plates are a number of holes, in either of which the said legs may be inserted, and by which the seat may be adjusted at any height and the driver's weight made to press equally upon all parts.

Below the driver's seat is a lever, $D^3$, hinged at one end to a rigid arm, $D^4$, depending from the seat, and adapted to be adjusted along the leg D', and held in any position by a pin, $c$. A rod, $D^5$, connects the lever $D^3$ with the pole B, and by adjusting said lever and securing it the seat D may be swung or tilted backward or forward, and secured in either of these positions.

E designates wheels, represented as two in number and placed behind the harrow. These wheels are free to rotate on bearings extending from one end of swinging arms E', which are hinged at the other end to the harrow, thus permitting the free adjustment of the wheels E up and down. The means here shown for effecting such adjustment consist of quadrant-levers $E^2$, connected by links $d$ with the bearings of the wheels, and pivoted at $d'$ to a quadrant-support, $E^3$. The levers $E^2$ carry catch-bars, which engage with notches in the quadrant-supports $E^3$, and are actuated by springs $d^2$. The levers $E^2$ extend within reach of the driver, and may be operated by him to adjust the wheels up or down.

When the wheels are in their lowest position the harrow is raised, and may be transported upon the said wheels without the teeth touching the ground.

The harrow may also be raised by depressing the wheels while in use, for the purpose of freeing it from weeds which might clog it, or of enabling it to clear stones or other obstructions.

The outermost sections, C, are hinged to the sections A by hinges $e$; and, for the purpose of increasing the pressure of said hinged sections upon the ground and keeping them to their work, I employ springs $e'$, here represented as consisting of wire spirally wound upon the hinge-pin and having its ends extending in opposite directions. The pressure of these springs may be adjusted by securing one end in a catch, $e^2$, which is slotted so as to permit of its adjustment toward and from the hinge-pin.

When the harrow is to be transported from place to place upon the wheels E, the sections C may be adjusted upward, as shown in full outline in Fig. 2, and may be held in such position by chains $f$, provided with hooks, which may be fastened in the support $E^3$. When the sections C are so swung and held upright the harrow will be greatly reduced in width, and can be taken through gates and upon roads which would otherwise be impassable to it.

If desired, a seed-sower may be mounted upon the front of the harrow, and the seed may then be sowed and harrowed in by going once over the ground. The seed-sower here represented consists of two seed-boxes, F, hinged to the pole B at $g$, so as to adjust themselves with the harrow to the inequalities of the ground, and two sections, G, hinged to the aforesaid sections F at $g'$, and adapted to be folded over upon the sections F when the harrow is to be transported. The seed-boxes are provided with hinged covers $h$, adapted to be tightly closed in order to prevent the escape of seed, and they are supported upon bearers $i$ extending from the harrow, and from which the boxes may be detached when it is desired to use the implement as a harrow only.

The seed-boxes are represented as downwardly tapering at the sides, and as provided at the bottom with fluted or grooved rollers $j$, which, by their rotation, serve to evenly distribute the seed over the ground; and in order to permit of the folding of the sections of the seed-box the shafts of the rollers should be constructed so as to be easily coupled together, as, for instance, by providing one roller with a flat tongue adapted to enter a slot in the end of the adjacent roller.

Motion may be imparted to the several rollers by means of a driving-shaft, $k$, acting through bevel-gearing $l$, and deriving motion through a spur-pinion, $m$, from a crown-wheel, H, arranged at the back of the harrow, and having a smooth outer rim which serves to rotate the said wheel as it passes over the ground. The wheel H is supported on a bearing extending from an elastic arm, $n$, secured to the pole B; and when it is desired to suspend the sowing of seed for a time, the elastic arm $n$ may be raised sufficiently to enable the wheel H to clear the ground, and be sustained in such raised position by a chain, $o$, provided with a hook, which may be fastened to the seat D, as represented in Fig. 3. By reference to the said figure it will also be understood that the wheel H is provided with several circumferential rows of teeth, $p$, and that by shifting the pinion $m$ toward or from the center of said wheel, the speed of rotation of the fluted or grooved rollers $j$ may be varied, and the seed distributed more thickly or thinly to suit different kinds of seeds.

The interior of the seed-boxes are provided with cloth or bristles $q$, which extend down over the rollers $j$, and prevent any seed from leaking out between the rollers and the sides of the boxes.

I designates a draw-bar, and J whiffletrees, to which the horses may be attached to draw the harrow.

By my invention it will be seen that I provide a convenient and easily-adjustable harrow, which may be adjusted to enable it to be transported from place to place upon wheels to clear it from weeds, and one which will adapt itself to the surface of the ground over which it passes.

What I claim as my invention, and desire to secure by Letters Patent, is—

1. The combination, with a harrow composed of two sections hinged longitudinally to the pole at the center of the harrow, of seed-boxes supported by said sections of the harrow, and likewise hinged longitudinally to said pole, whereby the harrow and seed-boxes adjust themselves to the surface of the ground over which the harrow is drawn, substantially as specified.

2. The combination, with the seat D, of the legs $D'$ and $D^2$, supporting the same, and the lever $D^3$ and rod $D^5$, whereby the said seat may be tilted backward or forward and secured in any position, substantially as specified.

WILLIAM H. TRAYLOR.

Witnesses:
W. H. MILLER,
JAS. S. GRIMES.